US008826101B2

(12) United States Patent
Hargan

(10) Patent No.: US 8,826,101 B2
(45) Date of Patent: Sep. 2, 2014

(54) MEMORY SYSTEM AND METHOD USING A MEMORY DEVICE DIE STACKED WITH A LOGIC DIE USING DATA ENCODING, AND SYSTEM USING THE MEMORY SYSTEM

(71) Applicant: Micron Technology, Inc., Boise, ID (US)

(72) Inventor: Ebrahim Hargan, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 14/028,134

(22) Filed: Sep. 16, 2013

(65) Prior Publication Data

US 2014/0053040 A1    Feb. 20, 2014

Related U.S. Application Data

(63) Continuation of application No. 13/371,045, filed on Feb. 10, 2012, now Pat. No. 8,539,312, which is a continuation of application No. 12/192,796, filed on Aug. 15, 2008, now Pat. No. 8,127,204.

(51) Int. Cl.
*G06F 11/00* (2006.01)
(52) U.S. Cl.
USPC ........................................................ 714/766
(58) Field of Classification Search
CPC .................... G06F 11/1044; G06F 11/1048
USPC ........................................................ 714/766
See application file for complete search history.

(56) References Cited

U.S. PATENT DOCUMENTS

| 5,179,303 | A | 1/1993 | Searles et al. |
| 5,263,032 | A | 11/1993 | Porter et al. |
| 5,748,914 | A | 5/1998 | Barth et al. |
| 5,774,475 | A | 6/1998 | Qureshi |

(Continued)

FOREIGN PATENT DOCUMENTS

| CN | 101036131 | 9/2007 |
| JP | 05-265872 | 10/1993 |

(Continued)

OTHER PUBLICATIONS

International Search Report and Written Opinion dated Jul. 31, 2012 for PCT Application No. PCT/US2011/062009.

(Continued)

*Primary Examiner* — Bryce Bonzo
(74) *Attorney, Agent, or Firm* — Dorsey & Whitney LLP

(57) ABSTRACT

A memory system and method using at least one memory device die stacked with and coupled to a logic die by interconnects, such as through silicon vias. One such logic die includes an ECC system generating error checking and correcting ("ECC") bits corresponding to write data. The write data are transmitted to the memory device dice in a packet containing a serial burst of a plurality of parallel data bits. The ECC bits are transmitted to the memory device dice using through silicon vias that are different from the vias through which data are coupled. Such a logic die could also include a data bus inversion ("DBI") system encoding the write data using a DBI algorithm and transmitting to the memory device dice DBI bits indicating whether the write data have been inverted. The DBI bits are transmitted using through silicon vias that are shared with the ECC bits when they are unused for transferring the ECC bits.

21 Claims, 5 Drawing Sheets

(56) References Cited

U.S. PATENT DOCUMENTS

| | | |
|---|---|---|
| 5,960,008 A | 9/1999 | Osawa et al. |
| 5,982,684 A | 11/1999 | Schwartzlow et al. |
| 6,052,329 A | 4/2000 | Nishino et al. |
| 6,122,688 A | 9/2000 | Barth et al. |
| 6,177,807 B1 | 1/2001 | Bertin et al. |
| 6,181,616 B1 | 1/2001 | Byrd |
| 6,247,138 B1 | 6/2001 | Tamura et al. |
| 6,285,211 B1 | 9/2001 | Sample et al. |
| 6,363,017 B2 | 3/2002 | Polney |
| 6,401,213 B1 | 6/2002 | Jeddeloh |
| 6,519,194 B2 | 2/2003 | Tsujino et al. |
| 6,574,626 B1 | 6/2003 | Regelman et al. |
| 6,650,157 B2 | 11/2003 | Amick et al. |
| 6,658,523 B2 | 12/2003 | Janzen et al. |
| 6,839,260 B2 | 1/2005 | Ishii |
| 6,882,304 B2 | 4/2005 | Winter et al. |
| 6,889,334 B1 | 5/2005 | Magro et al. |
| 6,907,555 B1 | 6/2005 | Nomura et al. |
| 7,058,865 B2 | 6/2006 | Mori et al. |
| 7,107,424 B1 | 9/2006 | Avakian et al. |
| 7,135,905 B2 | 11/2006 | Teo et al. |
| 7,149,134 B2 | 12/2006 | Streif et al. |
| 7,168,005 B2 | 1/2007 | Adams et al. |
| 7,171,596 B2 | 1/2007 | Boehler |
| 7,184,916 B2 | 2/2007 | Resnick et al. |
| 7,197,101 B2 | 3/2007 | Glenn et al. |
| 7,203,259 B2 | 4/2007 | Glenn et al. |
| 7,243,469 B2 | 7/2007 | Miller et al. |
| 7,389,375 B2 | 6/2008 | Gower et al. |
| 7,464,241 B2 | 12/2008 | Pete |
| 7,466,179 B2 | 12/2008 | Huang et al. |
| 7,489,743 B2 | 2/2009 | Koh et al. |
| 7,567,476 B2 | 7/2009 | Ishikawa |
| 7,697,369 B2 | 4/2010 | Koshizuka |
| 7,710,144 B2 | 5/2010 | Dreps et al. |
| 7,764,564 B2 | 7/2010 | Saito et al. |
| 7,772,907 B2 | 8/2010 | Kim et al. |
| 7,855,931 B2 | 12/2010 | LaBerge et al. |
| 7,979,757 B2 | 7/2011 | Jeddeloh |
| 8,010,866 B2 | 8/2011 | LaBerge |
| 8,127,204 B2 | 2/2012 | Hargan |
| 8,248,136 B1 | 8/2012 | Liu |
| 8,289,760 B2 | 10/2012 | Jeddeloh |
| 8,356,138 B1 | 1/2013 | Kulkarni et al. |
| 8,400,808 B2 | 3/2013 | King |
| 2002/0004893 A1 | 1/2002 | Chang |
| 2002/0054516 A1 | 5/2002 | Taruishi et al. |
| 2002/0097613 A1 | 7/2002 | Raynham |
| 2002/0125933 A1 | 9/2002 | Tamura et al. |
| 2002/0130687 A1 | 9/2002 | Duesman |
| 2002/0133666 A1 | 9/2002 | Janzen et al. |
| 2002/0138688 A1 | 9/2002 | Hsu et al. |
| 2003/0041299 A1 | 2/2003 | Kanazawa et al. |
| 2003/0132790 A1 | 7/2003 | Amick et al. |
| 2004/0073767 A1 | 4/2004 | Johnson et al. |
| 2004/0098545 A1 | 5/2004 | Pline et al. |
| 2004/0160833 A1 | 8/2004 | Suzuki |
| 2004/0168101 A1 | 8/2004 | Kubo |
| 2004/0199840 A1 | 10/2004 | Takeoka et al. |
| 2004/0206982 A1 | 10/2004 | Lee et al. |
| 2004/0237023 A1 | 11/2004 | Takahashi et al. |
| 2004/0246026 A1 | 12/2004 | Wang et al. |
| 2005/0005230 A1 | 1/2005 | Koga et al. |
| 2005/0071707 A1 | 3/2005 | Hampel |
| 2005/0091471 A1 | 4/2005 | Conner et al. |
| 2005/0144546 A1 | 6/2005 | Igeta et al. |
| 2005/0157560 A1 | 7/2005 | Hosono et al. |
| 2005/0174877 A1 | 8/2005 | Cho et al. |
| 2005/0278490 A1 | 12/2005 | Murayama |
| 2006/0036827 A1 | 2/2006 | Dell et al. |
| 2006/0059406 A1 | 3/2006 | Micheloni et al. |
| 2006/0123320 A1 | 6/2006 | Vogt |
| 2006/0126369 A1 | 6/2006 | Raghuram |
| 2006/0223012 A1 | 10/2006 | Sekiguchi et al. |
| 2006/0233012 A1 | 10/2006 | Sekiguchi et al. |
| 2006/0245291 A1 | 11/2006 | Sakaitani |
| 2006/0253723 A1 | 11/2006 | Wu et al. |
| 2006/0262587 A1 | 11/2006 | Matsui et al. |
| 2006/0273455 A1 | 12/2006 | Williams et al. |
| 2007/0058410 A1 | 3/2007 | Rajan |
| 2007/0070669 A1 | 3/2007 | Tsern |
| 2007/0074093 A1 | 3/2007 | Lasser |
| 2007/0136645 A1 | 6/2007 | Hsueh et al. |
| 2007/0271424 A1 | 11/2007 | Lee et al. |
| 2008/0147897 A1 | 6/2008 | Talbot |
| 2008/0150088 A1 | 6/2008 | Reed et al. |
| 2008/0250292 A1 | 10/2008 | Djordjevic |
| 2009/0006775 A1 | 1/2009 | Bartley et al. |
| 2009/0016130 A1 | 1/2009 | Menke et al. |
| 2009/0021992 A1 | 1/2009 | Oh |
| 2009/0091968 A1* | 4/2009 | Dietrich et al. ............... 365/148 |
| 2009/0196093 A1 | 8/2009 | Happ et al. |
| 2009/0251189 A1 | 10/2009 | Hsieh |
| 2009/0300314 A1 | 12/2009 | Laberge et al. |
| 2009/0300444 A1 | 12/2009 | Jeddeloh |
| 2010/0005217 A1 | 1/2010 | Jeddeloh |
| 2010/0005376 A1 | 1/2010 | Laberge et al. |
| 2010/0014364 A1 | 1/2010 | Laberge et al. |
| 2010/0031129 A1 | 2/2010 | Hargan |
| 2010/0042889 A1 | 2/2010 | Hargan |
| 2010/0070696 A1 | 3/2010 | Blankenship |
| 2010/0079180 A1 | 4/2010 | Kim et al. |
| 2010/0091537 A1 | 4/2010 | Best et al. |
| 2010/0110748 A1 | 5/2010 | Best |
| 2011/0075497 A1 | 3/2011 | Laberge |
| 2011/0271158 A1 | 11/2011 | Jeddeloh |
| 2011/0296227 A1 | 12/2011 | LaBerge et al. |
| 2012/0144276 A1 | 6/2012 | Hargan |
| 2012/0155142 A1 | 6/2012 | King |
| 2013/0208549 A1 | 8/2013 | King |
| 2013/0318298 A1 | 11/2013 | LaBerge et al. |
| 2013/0346722 A1 | 12/2013 | LaBerge et al. |

FOREIGN PATENT DOCUMENTS

| | | |
|---|---|---|
| JP | 0774620 | 3/1995 |
| JP | 11-102599 | 4/1999 |
| JP | 11-513830 | 11/1999 |
| JP | 2003-303139 | 10/2003 |
| JP | 2004-327474 | 11/2004 |
| JP | 2005-4947 | 1/2005 |
| JP | 2007-507794 | 3/2007 |
| JP | 2007-140948 | 6/2007 |
| JP | 2007-226876 | 9/2007 |
| JP | 2007-328636 | 12/2007 |
| JP | 2008-112503 | 5/2008 |
| JP | 2008-140220 | 6/2008 |
| JP | 2010-514080 | 4/2010 |
| WO | 97/14289 | 4/1997 |
| WO | 2005/033958 | 4/2005 |
| WO | 2007/038225 | 4/2007 |
| WO | 2007/095080 | 8/2007 |
| WO | 2008/054696 | 5/2008 |
| WO | 2008/073676 | 6/2008 |
| WO | 2009/148863 | 12/2009 |
| WO | 2010/002561 | 1/2010 |
| WO | 2010/011503 | 1/2010 |
| WO | 2012/060097 | 5/2012 |
| WO | 2012/082338 | 6/2012 |

OTHER PUBLICATIONS

International Search Report and Written Opinion dated Feb. 11, 2010 for PCT Application No. PCT/US2009/050155.
Notice of Final Rejection dated Feb. 2, 2013 for KR Application No. 10-2011-7001535.
Notice of Preliminary Rejection dated Jun. 18, 2012 for KR Appl. No. 10-2011-7001535
Notice of Preliminary Rejection dated Jun. 21, 2012 for KR Appl. No. 10-2011-7002786.
Notice of Preliminary Rejection dated Mar. 21, 2013 for KR Application No. 10-2011-7002671.
Office Action dated Oct. 30, 2012 for KR Application No. 10-2012-7021899.

(56) References Cited

OTHER PUBLICATIONS

Office action dated Jan. 22, 2013 for Japanese Application No. 2011-516422.
Office Action dated Feb. 12, 2013 received for JP Application No. 2011-520079.
Office Action dated Nov. 2, 2012 for CN Application No. 200980125792.2.
Office Action dated Nov. 6, 2012 for JP Application No. 2011-516419.
Taiwanese Search Report dated Mar. 11, 2013 for TW Application No. 098114848.
CN First Office Action for CN Application No. 200980128341.4 dated Apr. 3, 2013.
Decision of Rejection dated Jul. 16, 2013 for JP Application No. 2011-516419.
Extended Search Report dated Jun. 28, 2013 for EP Application No. 13157772.8.
International Search Report and Written Opinion dated Feb. 18, 2010 for PCT Application No. PCT/US2009/046898.
Office Action dated Jun. 14, 2013 for KR Application No. 10-2013-7010171.
Notice of Preliminary Rejection dated Sep. 24, 2012 for KR Application No. 1020117002671.
Notice of Rejection dated Jun. 25, 2013 for JP Application No. 2011-520079.
TW First Office Action and Search Report dated Apr. 24, 2013 for TW Application No. 098120886.
TW Office Action dated May 9, 2013 for TW Application No. 098124606.
Extended European Search Report dated Aug. 2, 2011 for EP Application No. 09800787.5.
Extended European Search Report dated Aug. 29, 2011 for EP Application No. 09774012.0.
International Search Report and Written Opinion dated Jan. 6, 2010 for PCT Application No. PCT/US2009/045059.
International Search Report and Written Opinion dated Jan. 22, 2010 for PCT Application No. PCT/US2009/046956.
First Examination Report dated Feb. 21, 2013 received for EP 09800787.5.
First Office Action dated Jan. 25, 2013 for CN Application No. 20098012573.7.
Office Action dated Mar. 11, 2013 for TW Application No. 098114848.
Second Office Action for CN Application No. 200980125792.2 dated Aug. 29, 2013.
Office Action for TW Application No. 098121258 issued Dec. 2, 2013.
Preliminary Rejection for KR Application No. 10-2011-7002671 issued Nov. 28, 2013.
Second Office Action for CN Application No. 200980128341.4; Issued Nov. 19, 2013.

* cited by examiner

| EC00 | EC4 | EC28 | D0 | D1 | D2 | D3 | D4 | D5 | D6 | D7 | D8 | D9 | D10 | D11 | D12 | D13 | D14 | D15 | D16 | D17 | D18 | D19 | D20 | D21 | D22 | D23 | D24 | D25 | D26 | D27 | D28 | D29 | D30 | D31 |
|---|---|---|---|---|---|---|---|---|---|---|---|---|---|---|---|---|---|---|---|---|---|---|---|---|---|---|---|---|---|---|---|---|---|---|
| EC1 | EC5 | DBI0 | D32 | D33 | D34 | D35 | D36 | D37 | D38 | D39 | D40 | D41 | D42 | D43 | D44 | D45 | D46 | D47 | D48 | D49 | D50 | D51 | D52 | D53 | D54 | D55 | D56 | D57 | D58 | D59 | D60 | D61 | D62 | D63 |
| EC2 | EC6 | DBI1 | D64 | D65 | D66 | D67 | D68 | D69 | D70 | D71 | D72 | D73 | D74 | D75 | D76 | D77 | D78 | D79 | D80 | D81 | D82 | D83 | D84 | D85 | D86 | D87 | D88 | D89 | D90 | D91 | D92 | D93 | D94 | D95 |
| EC3 | EC7 | DBI2 | D96 | D97 | D98 | D99 | D100 | D101 | D102 | D103 | D104 | D105 | D106 | D107 | D108 | D109 | D110 | D111 | D112 | D113 | D114 | D115 | D116 | D117 | D118 | D119 | D120 | D121 | D122 | D123 | D124 | D125 | D126 | D127 |

* MINIMUM TRANSITION DBI ALGORITHM, WHICH DOES NOT HAVE DATA FOR 1ST BIT OF THE BURST MOST OF THE TIMES (REDUCE SWITCHING NOISE)
* MINIMUM ZEROES DBI ALGORITHM FOR 3 OF 4 BITS OF BURST (POWER REDUCTION)
* MINIMUM ZEROES DBI ALGORITHM 1 BIT FOR 2 BITS OF BURST TRANSFER (POWER REDUCTION)

FIGURE 4

MEMORY SYSTEM AND METHOD USING A MEMORY DEVICE DIE STACKED WITH A LOGIC DIE USING DATA ENCODING, AND SYSTEM USING THE MEMORY SYSTEM

CROSS-REFERENCE TO RELATED APPLICATION

This application is a continuation of U.S. patent application Ser. No. 13/371,045, filed Feb. 10, 2012, which is a continuation of U.S. patent application Ser. No. 12/192,796, filed Aug. 15, 2008, issued as U.S. Pat. No. 8,127,204 on Feb. 28, 2012. These applications and patent are incorporated by reference herein in their entirety and for all purposes.

TECHNICAL FIELD

This invention relates to memory devices, and, more particularly, in one or more embodiments to a memory system having a plurality of stacked memory device dice connected to a logic die in which data are coupled between the logic die and the memory device dice using data bus inversion.

BACKGROUND OF THE INVENTION

As memory devices of all types have evolved, continuous strides have been made in improving their performance in a variety of respects. For example, the storage capacity of memory devices has continued to increase at geometric proportions. This increased capacity, coupled with the geometrically higher operating speeds of electronic systems containing memory devices, has made high memory device bandwidth ever more critical. One application in which memory devices, such as dynamic random access memory ("DRAM") devices, require a higher bandwidth is their use as system memory in computer systems. As the operating speed of processors has increased, processors are able to read and write data at correspondingly higher speeds. Yet conventional DRAM devices often do not have the bandwidth to read and write data at these higher speeds, thereby slowing the performance of conventional computer systems. This problem is exacerbated by the trend toward multi-core processors and multiple processor computer systems. It is currently estimated that computer systems operating as high-end servers are idle as many as 3 out of every 4 clock cycles because of the limited data bandwidth of system memory devices. In fact, the limited bandwidth of DRAM devices operating as system memory can reduce the performance of computer systems to as low as 10% of the performance of which they would otherwise be capable.

Various attempts have been made to increase the data bandwidth of memory devices. For example, wider internal data buses have been used to transfer data to and from arrays with a higher bandwidth. However, doing so usually requires that write data be serialized and read data deserialized at the memory device interface. Another approach has been to simply scale up the size of memory devices or conversely shrink their feature sizes, but, for a variety of reasons, scaling has been incapable of keeping up with the geometric increase in the demand for higher data bandwidths. Proposals have also been made to stack several integrated circuit memory device dice in the same package.

Several other issues often arise in the design and use of memory devices. One of these issues is power consumption. In some applications, such as in portable electronic devices, power consumption is very important because it can seriously reduce the operating time of battery powered devices such as laptop computers. Minimizing power consumption is important even for electronic devices that are not battery powered because reducing power reduces the heat generated by the memory devices.

Another issue that often arises is the inadvertent loss of data stored in memory devices, such as dynamic random access memory ("DRAM") devices. DRAM devices need to be periodically refreshed to avoid loosing data. If DRAM devices are not refreshed frequently enough, data retention errors can occur. Unfortunately, refresh consumes a substantial amount of power, thus making it desirable to minimize the frequency of refreshes. As a result of this trade-off between power consumption and minimizing data errors, DRAM devices are often refreshed near the rate at which data retention errors can occur. Data retention errors can also occur in other types of memory devices, such as flash memory devices, for different reasons. The time duration before which data retention errors become an issue can be extended by generating an error correcting code ("ECC") for each item of write data, and storing the ECC in the memory device with the write data. When the data are read, the ECC is read along with the read data and used to determine if a data retention error has occurred, and, if so, the ECC can often be used to correct the error.

Still another issue that often arises in the design of memory devices is minimizing the signal connections to the die of the memory device. The area used by bond wire consumes space on the die that could be used for fabricating transistors to increase the capacity of the memory device. The same problem also exists for the area consumed on a memory device die by through silicon vias ("TSVs") connected to stacked memory devices.

As mentioned above, proposals have been made to increase the bandwidth of a memory device by stacking several integrated circuit memory device dice in the same package. Although doing so does to some extent alleviate the problem of limited bandwidth, it can exacerbate the other problems discussed above, including power consumption and consuming excessive die area with TSVs, particularly if ECC techniques are to be used to correct data retention errors.

Therefore, a need exists for a method and system to stack memory device dice in a manner that maximizes the area of a die available for memory capacity, does not unduly increase the number of required terminals, and does not substantially increase power consumption.

BRIEF DESCRIPTION OF THE DRAWINGS

FIG. 4 is a table showing an embodiment of a write and read data packet coupled to and from, respectively, each of the memory device dice.

DETAILED DESCRIPTION

Figure 1:
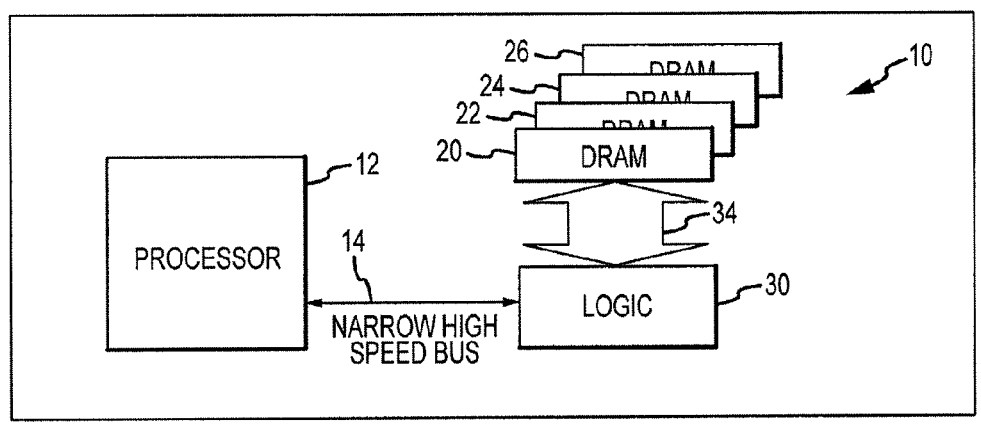
FIG. 1 is a block diagram of an embodiment of a processor-based system that includes a memory system containing stacked memory device dice according to an embodiment of the invention.

A computer system including a high-capacity, high bandwidth memory system 10 according to an embodiment of the invention is shown in FIG. 1. The memory system 10 is connected to a memory access device, such as a processor 12 through a relatively narrow high-speed bus 14 that is divided into downstream lanes and separate upstream lanes (not shown in FIG. 1). The memory system 10 includes 4 DRAM dice 20, 22, 24, 26, which may be identical to each other, stacked on top of each other. Although the memory system 10 includes 4 DRAM dice 20, 22, 24, 26, other embodiments of the memory device use a greater or lesser number of DRAM dice. The stacked DRAM dice 20, 22, 24, 26 are connected to a logic die 30, which serves as the interface with the processor 12. The logic die 30 can be physically positioned relative to DRAM dice 20, 22, 24, 26 in any order, such as by stacking the DRAM dice 20, 22, 24, 26 on top of the logic die 30. However, the logic die 30 could, for example, be positioned in the middle of the stack of DRAM dice 20, 22, 24, 26.

The logic die 30 can implement a variety of functions in the memory system 10, such as to limit the number of functions that must be implemented in the DRAM dice 20, 22, 24, 26. For example, the logic die 30 may perform memory management functions, such as power management and refresh of memory cells in the DRAM dice 20, 22, 24, 26. In the embodiment shown in FIGS. 1-3, the logic die 30 performs error checking and correcting ("ECC") functions. In the embodiments described herein, the logic die 30 uses data encoding, e.g., bus inversion, techniques for data transmitted to and received from the DRAM dice 20, 22, 24, 26, as described in greater detail below.

The DRAM dice 20, 22, 24, 26 may be connected to each other and they are connected to the logic die 30 by a relatively wide bus 34. The bus 34 may be implemented with interconnects, such as through silicon vias ("TSVs"), which comprise a number of conductors extending at least partially through the DRAM dice 20, 22, 24, 26 at the same locations on the DRAM dice and connect to respective conductors formed on and/or in the dice 20, 22, 24, 26. In one embodiment, each of the DRAM dice 20, 22, 24, 26 are divided into 16 autonomous partitions, each of which may contain 2 or 4 independent memory banks. In such case, the partitions of each dice 20, 22, 24, 26 that are stacked on top of each other may be independently accessed for read and write operations. Each set of 16 stacked partitions may be referred to as a "vault." Thus, the memory system 10 may contain 16 vaults.

Figure 2:
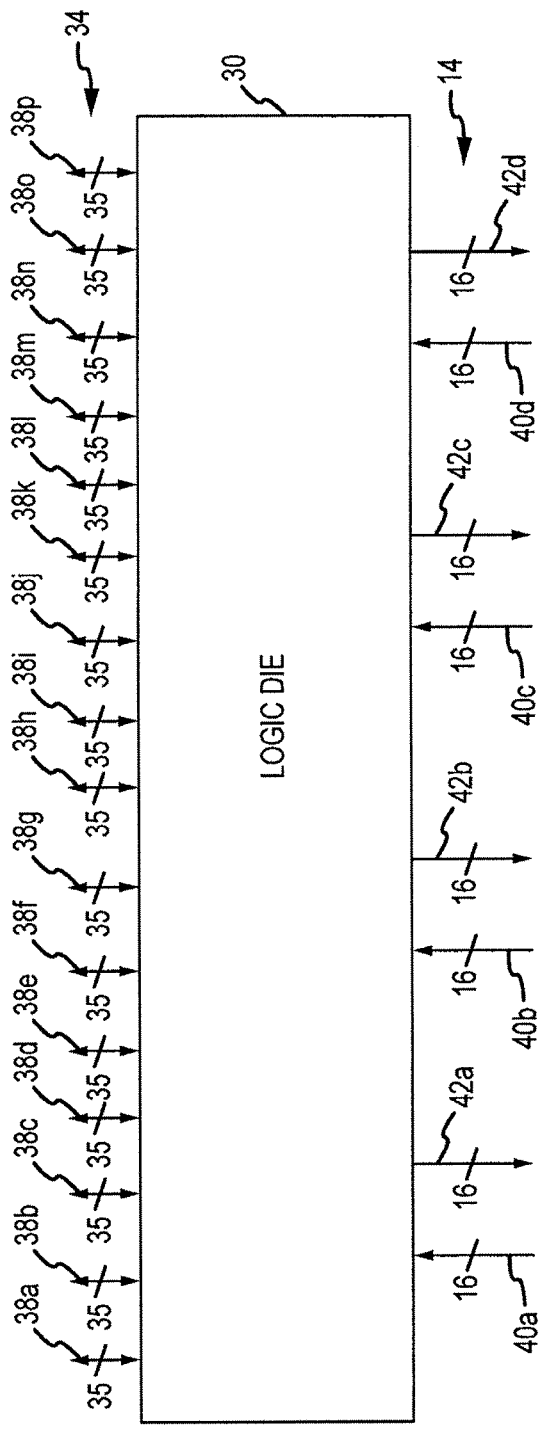
FIG. 2 is a block diagram of an embodiment of a logic die used in the memory system of FIG. 1 showing the connections to the logic die.

As shown in FIG. 2 and as explained in greater detail below, one of the functions performed by the logic die 30 is to deserialize 16 serial data bits coupled through one of the 16-bit downstream lanes 40a-d of the bus 14 to obtain 8 sets of 32 parallel data bits. The logic die 30 then couples these 256 bits and 32 ECC or data bus inversion ("DBI") bits to a "vault" of the DRAM dice 20, 22, 24, 26 through respective 35-bit sub-buses 38a-o in two packets, each of which includes a serial stream of four sets of 32 parallel data bits and 3 ECC/DBI bits. However, other embodiments may use different numbers of lanes 40, 42 having different widths or different numbers of sub-buses 38a-p having different widths, and they may couple data bits having different structures. The logic die may also serialize the four sets of 32 parallel data bits and 3 ECC/DBI bits coupled from each vault of the DRAM dice 20, 22, 24, 26 into a serial stream of 16 serial data bits coupled through each of 16 parallel bits of one of the upstream lanes 42a-d of the bus 14. As will be appreciated by one skilled in the art, the stacking of multiple DRAM dice results in a memory device having a very large capacity. Further, the use of a very wide bus connecting the DRAM dice allows data to be coupled to and from the DRAM dice with a very high bandwidth.

Figure 3:
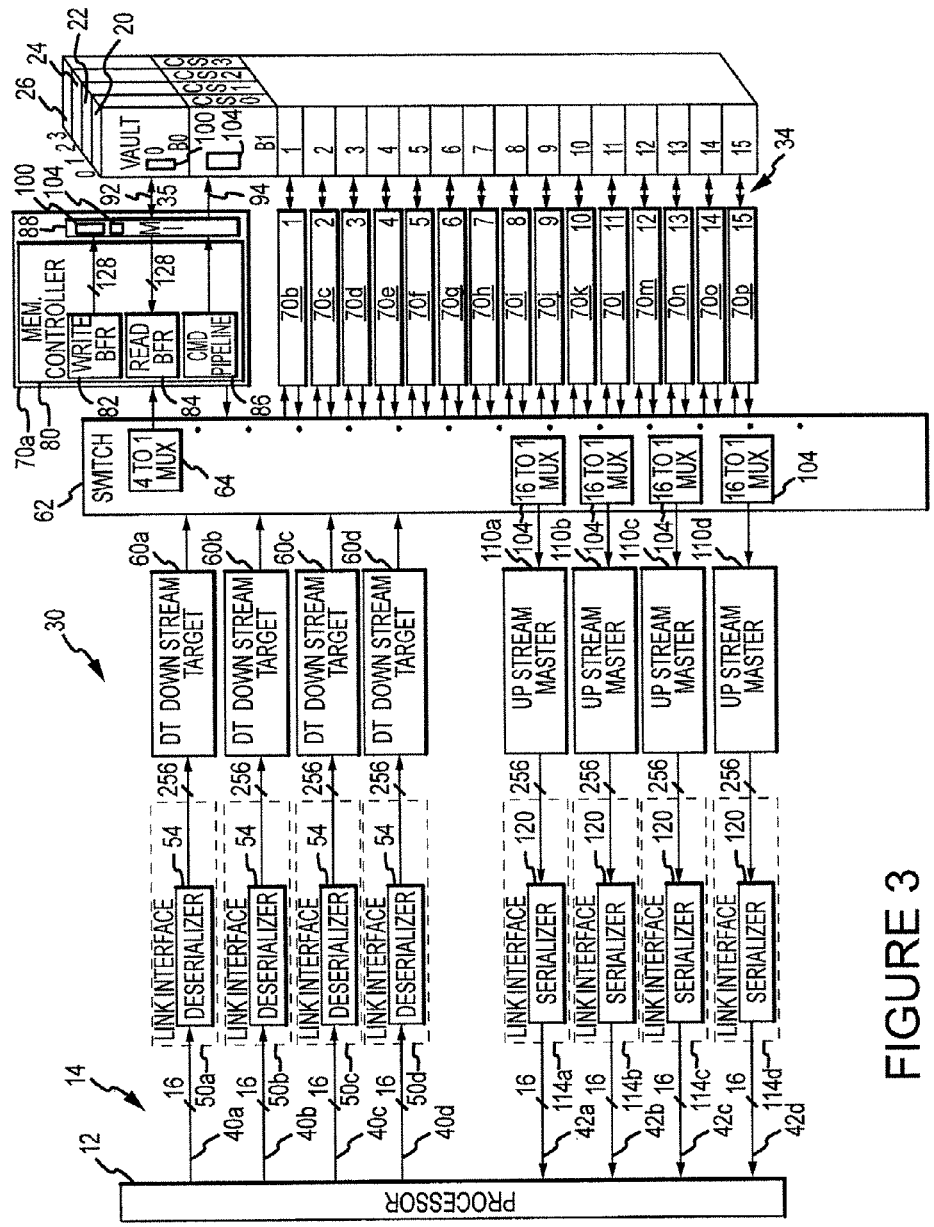
FIG. 3 is a more detailed block diagram of an embodiment of the processor-based system of FIG. 1 showing the memory system in greater detail.

A logic die 30 according to an embodiment of the invention is shown in FIG. 3 connected to the processor 12 and the DRAM dice 20, 22, 24, 26. As shown in FIG. 3, each of the 4 downstream lanes 40a-d is connected to a respective link interface 50a-d. Each link interface 50a-d includes a deserializer 54 that converts each serial stream of 16 data bits on each of the 16-bit lanes 40a-d to 256 parallel bits. Insofar as there are 4 link interfaces 50a-d, the link interfaces can together output 1024 output parallel bits.

Each of the link interfaces 50a-d applies its 256 parallel bits to a respective downstream target 60a-d, which decodes the command and address portions of the received packet and buffers write data in the event a memory request is for a write operation. The downstream targets 60a-d output their respective commands, addresses and possibly write data to a switch 62. The switch 62 contains 16 multiplexers 64 each of which direct the command, addresses and any write data from any of the downstream targets 60a-d to its respective vault of the DRAM dice 20, 22, 24, 26. Thus, each of the downstream targets 60a-d can access any of the 16 vaults in the DRAM dice 20, 22, 24, 26. The multiplexers 64 use the address in the received memory requests to determine if its respective vault is the target of a memory request. Each of the multiplexers 64 apply the memory request to a respective one of 16 vault controllers 70a-p.

Each vault controller 70a-p includes a respective memory controller 80, each of which includes a write buffer 82, a read buffer 84 and a command pipeline 86. The commands and addresses in memory requests received from the switch 62 are loaded into the command pipeline 86, which subsequently outputs the received commands and corresponding addresses. Any write data in the memory requests are stored in the write buffer 82. The read buffer 84 is used to store read data from the respective vault, as will be explained in greater detail below. Both the write data from the write buffer 82 and the commands and addresses from the command pipeline 86 of each of the vault controllers 70a-p are applied to a memory interface 88. The memory interface 88 couples commands and addresses from the command pipelines 86 to the DRAM dice 20, 22, 24, 26 through a command/address bus 94. The memory interface 88 includes an error checking system and a data bus inversion system, such as those embodied in a transmitter 100 and receiver 104. Transmitter 100 receives 128 bits of write data from the respective write buffer 82, and generates 12 ECC/DBI bits from the write data. The transmitter 100 first uses some of the ECC/DBI bits to encode the write data using conventional data inversion techniques, some of which are discussed below. The transmitter 100 then serializes the write data and ECC/DBI bits into a stream of four sets of 32-bit write data and four sets of 3 parallel ECC/DBI bits. The serialized write data and ECC/DBI data are then coupled through a 35-bit data bus 92 to the DRAM dice 20, 22, 24, 26. In the embodiment shown in FIG. 3, write data are coupled to the write buffer 82 in synchronism with a 500 MHz clock so the data are stored in the write buffer 82 at 16 gigabytes ("GB") per second. The write data are coupled from the write buffer 82 to the DRAM dice 20, 22, 24, 26 using a 2 GHz clock so the data are output from the write buffer 82 at 8 GB/s. Therefore, as long as more than half of the memory requests are not write operations to the same vault, the write buffers 82 will be able to couple the write data to the DRAM dice 20, 22, 24, 26 at least as fast as the data are coupled to the write buffer 82.

A receiver 104 is also included in the memory interface 88. Each vault of each of the DRAM dice 20, 22, 24, 26 includes a respective one of the transmitters 100 that transmit four sets of 32-bit read data and four sets of 3 parallel ECC/DBI bits to the receiver 104 through the 35-bit data bus 92. In the event a memory request is for a read operation, the command and address for the request are coupled to the DRAM dice 20, 22, 24, 26 in the same manner as a write request, as explained above. In response to a read request, four sets of 32-bit read data and four sets of 3 parallel ECC/DBI bits are output from the DRAM dice 20, 22, 24, 26 through the 35-bit data bus 92. The receiver 104 deserializes the four sets of 32-bit read data into 128 bits, and deserializes the four sets of 3 parallel ECC/DBI bits into 12 parallel ECC/DBI bits. The receiver 104 then uses some of the ECC/DBI bits to check and possibly correct the read data, and it uses some of the ECC/DBI bits to decode the DBI-encoded read data using conventional data inversion techniques. The 128 bits of corrected read data are then applied to a read buffer 84 in the memory controller 80. The read buffer 84 accumulates two packets of 128-bit read data before outputting the read data. A respective one of the receivers 104 is also included in each vault of each of the DRAM dice 20, 22, 24, 26 to receive the write data and ECC/DBI bits from the corresponding transmitter in the respective memory interface 88.

After 2 packets of 128-bit read data have been stored in the read buffer 84, the read buffer transmits 256 bits to the switch 62. The switch includes 4 output multiplexers 104 coupled to respective upstream masters 110a-d. Each multiplexer 104 can couple 256 bits of parallel data from any one of the vault controllers 70a-p to its respective upstream master 110a-d. The upstream masters 110a-d format the 256 bits of read data into packet data and couple the packet to respective upstream link interfaces 114a-d. Each of the link interfaces 114a-d include a respective serializer 120 that converts the incoming 256 bits to a serial stream of 16 bits on each bit of a respective one of the 16-bit upstream links 42a-d.

An embodiment of a data and ECC/DBI packet that may be coupled between the logic die and the DRAM dice 20, 22, 24, 26 is shown in FIG. 4. As shown therein and as mentioned above, each packet includes 128 bits of data in 4 sets of 32 data bits. ECC/DBI bits are also coupled between the logic die and the DRAM dice 20, 22, 24, 26 in 4 sets of 3 bits. To provide single error correction, double error detection ("SECDED") for 128 bits, 9 ECC bits are required. Therefore, 3 of the 12 ECC/DBI bits can be used to encode the 128 bits of data using conventional data bus inversion techniques, some of which will be described below. These 3 DBI bits can be coupled between the logic die 30 and the DRAM dice 20, 22, 24, 26 without adding any additional TSVs since 3 TSVs are required to couple 9 ECC bits insofar as 2 TSVs are not sufficient to couple 9 bits in a burst of 4.

Figure 5:
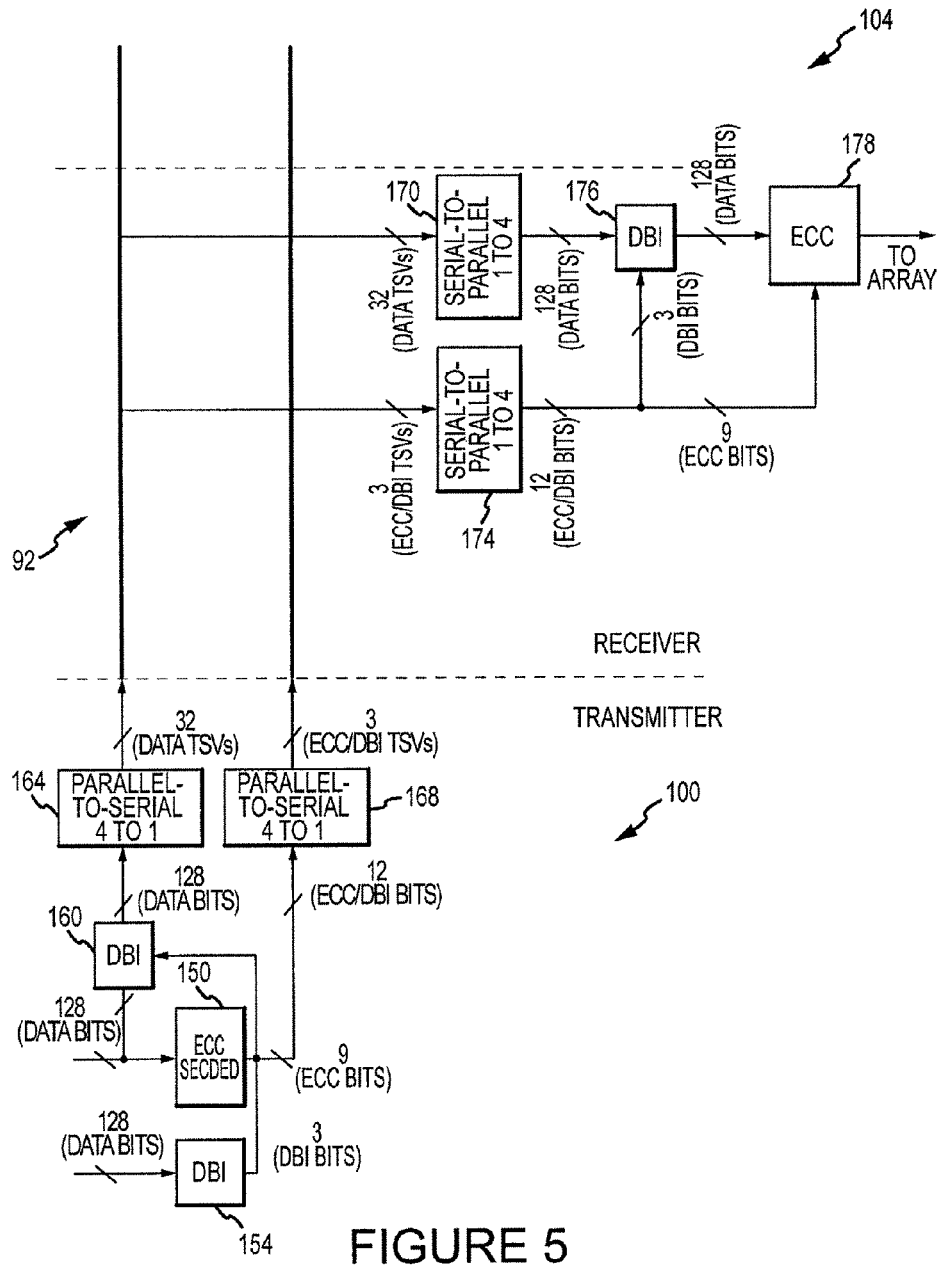
FIG. 5 is a block diagram showing an embodiment of a data transmitter and receiver that may be used in the memory system of FIGS. 1-3.

An embodiment of the transmitter 100 and the receiver 104 is shown in FIG. 5. The transmitter 100 includes a conventional SECDED ECC generator 150 that receives the 128 bits of write data from its respective write buffer 82, and generates 9 ECC bits from the write data. The transmitter 100 also includes a DBI generator 154 that receives the 128 bits of write data and generates 3 DBI bits using a conventional data bus inversion algorithm. The 128 bits of write data and the 3 DBI bits are applied to a conventional DBI encoder 160 that performs a DBI operation on subsets of the 128 bits of write data. As is well-known in the art, data bus inversion requires that each bit of data be either inverted or not inverted depending upon the state of the DBI bit. As explained in greater detail below, doing so can be very useful because it can reduce the number of logic level transitions that occur from one bit to the next. For example, if more that half of the 32 data bits transmitted to the DRAM dice 20, 22, 24, 26 transition from one set of 32 bits to the next, the number of transitions in the second set of 32 data bits can be reduced to less than half by inverting all of the bits in the second set. Thus, any bit, such as bit 2, which was logic "1" in the first set will remain at logic "1" in the second set even though the data bit 2 was really logic "0" in the second set. The DBI bit for the first set would be logic "0" to signify that the data was not inverted, but the DBI bit for the second set would be logic "1" to signify that the receiver should invert all of the data in the second set.

The 128 bits of DBI encoded write data are applied to a parallel-to-serial converter 164, which serializes the 128 bits into four sets of 32 bits. Similarly, the 9 ECC bits and up to 3 DBI bits are applied to a parallel-to-serial converter 168, which serializes the 12 bits into four sets of 3 bits. The resulting 35 bits are applied to the 35-bit data bus 92 (FIG. 4) as explained above. The 35-bit data bus is implemented using 35 TSVs.

The 35 bits transmitted through the data bus 92 are applied to the receiver 104. The 32 data bits in each set of the 35 are applied to a serial-to-parallel converter 170, which deserializes the 4 sets of 32 bits into 128 data bits. Similarly, the 4 sets of 3 ECC/DBI bits are applied to a serial-to-parallel converter 174, which deserializes the 4 sets of 3 bits into 9 ECC bits and up to 3 DBI bits. The DBI bits are applied to a conventional DBI decoder 176 that either inverts or does not invert subsets of the 128 bits of data depending upon the state of the respective DBI bits. The decoded data bits are then applied to a conventional SECDED ECC circuit 178, which uses the 9 ECC bits to check the 128 bits of read data. The 9 ECC bits can detect up to 2 single bit errors in the 128 bits, and they can correct a single bit error. The checked and corrected data are then output from the receiver.

Although the transmitter 100 and receiver 104 shown in FIG. 5 couple 128 data bits, and they use 9 ECC bits and up to 3 DBI bits, other embodiments use different numbers of data bits, ECC bits and DBI bits. The common principle of all of these embodiments is that an unused portion of the interconnects (e.g., the TSVs) needed to couple the required number of ECC bits are used for DBI data bits. As a result, data bus inversion techniques can be used without any penalty of increasing the number of TSVs.

It would require 4 DBI bits to separately encode each of the 32-bit sets of data coupled through the data bus 92, and there are only 3 DBI bits available. A variety of techniques can be used to address this issue. First, the 128 bits of data can be encoded in two sets of 64-bits, and a respective DBI bit would be used to encode each set. As a result, only 2 DBI bits would be used. Alternatively, only 3 sets of 32-bits, such as the last 3 sets, could be encoded using respective DBI bits. Other techniques may also be used.

The DBI encoder 154 and the DBI decoder 176 may operate according to any of a variety of conventional DBI algorithms. Using a minimum transition algorithm, the DBI encoder 154 analyzes each of the 32-bit subsets in the 128 bits of data to determine if the number of transitions from one set to the next would be reduced by inverting the bits in the next set. A minimum transition algorithm can be useful for reducing switching noise, and reducing the number of transitions can also reduce power consumption. The DBI encoder 154 can also use a minimum 0s algorithm. Using this algorithm, the DBI encoder 154 analyzes each of the 64-bit subsets in the 128 bits of data to determine if the number of logic "0" level in a transmission would be reduced by inverting the bits in each set of data bits. As is known in the art, many receivers consume more power when they receive a logic "0" input signal. As a result, the use of a minimum 0s algorithm can reduce the power consumed by the memory system 10. Other known or hereinafter developed DBI algorithms can also be used.

Although the data and ECC/DBI bits are applied to a receiver containing a DBI receiver 104 in the embodiment shown in FIG. 3, the use of a DBI receiver is not required. In other embodiments, the DBI bits are simply stored in and read from the DRAM dice 20, 22, 24, 26 along with the data and ECC bits. If so, 10 ECC bits would be required to perform SECDED ECC on the 128 bits plus DBI bits so only 2 bits would be available for DBI bits. The 128 data bits may then be DBI encoded in two sets using the 2 respective DBI bits. Even though the data would not be stored in the DRAM dice 20, 22, 24, 26 in its correct form, it would be corrected by the receiver 104 in the memory interface 88 when the data was read from the DRAM dice 20, 22, 24, 26. Alternatively, in other embodiments, the DBI bits are used to encode and decode the data and ECC bits, and the ECC bits are simply stored in the DRAM dice 20, 22, 24, 26. In still another embodiment, the DBI bits are simply stored in the DRAM dice 20, 22, 24, 26, but the ECC bits are used to check and correct data written to the array.

From the foregoing it will be appreciated that, although specific embodiments of the invention have been described herein for purposes of illustration, various modifications may be made without deviating from the spirit and scope of the invention. For example, although the embodiments of the invention are explained in the context of stacked DRAM dice, it will be understood that the stacked die may be other types of memory device die, such as flash memory device die. Also, although the embodiments of the invention have been explained with reference to using DBI encoding, other embodiments use other types of data encoding/decoding using data encoding bits other than DBI bits. Accordingly, the invention is not limited except as by the appended claims.

What is claimed is:

1. An apparatus, comprising:
a bus including a plurality of signal lines configured to transmit; and
a controller configured to serially provide a plurality of portions of data to the bus, a portion of data of the plurality of portions of data having fewer bits than a number of the plurality of signal lines of the bus, wherein the controller is further configured to provide additional information to the plurality of signal lines of the bus not utilized by the portion of data of the plurality of portions of data in parallel with the portion of the data of the plurality of portions of data.

2. The apparatus of claim 1, wherein the controller is configured to generate the additional information that is provided to the plurality of signal lines of the bus not utilized by the portion of data of the plurality of portions of data.

3. The apparatus of claim 2, wherein the additional information comprises error checking code bits, wherein the controller comprises an error checking system configured to generate the error checking code bits based on the data.

4. The apparatus of claim 3, wherein the error checking system is configured to generate the error checking bits using a single error correction, double error detection encoding scheme.

5. The apparatus of claim 2, wherein the additional information comprises a data bus inversion bit, wherein the controller comprises a data bus inversion system configured to generate the data bus inversion bit based on the data.

6. The apparatus of claim 5, wherein the data bus inversion system is further configured to encode at least a portion of the data based on a state of the data bus inversion bit.

7. The apparatus of claim 1, wherein the additional information comprises error correcting code bits and data bus inversion bits, wherein the controller is configured to provide the data bus inversion bits to the plurality of signal lines of the bus not utilized by the portion of data of the plurality of portions of data at a different time than the error correcting code bits.

8. An apparatus, comprising:
a receiver configured to, in a plurality of data bursts, receive a plurality of data bits and further receive a plurality of additional bits related to the plurality of data bits;
a first plurality of interconnects configured to, in the plurality of data bursts, provide the plurality of data bits to the receiver; and
a second plurality of interconnects configured to, in the plurality of data bursts, provide the plurality of additional bits to the receiver, wherein a count of the plurality of additional bits is less than or equal to a product of a count of the plurality of data bursts and a count of the second plurality of interconnects, wherein the plurality of additional bits include received error correcting bits and data bus inversion bits.

9. The apparatus of claim 8, wherein the receiver comprises a serial to parallel converter that is configured to deserialize the plurality of data bits.

10. The apparatus of claim 8, wherein the receiver comprises a serial to parallel converter that is configured to deserialize the additional bits into the received error correcting bits and the data bus inversion bits.

11. The apparatus of claim 10, wherein the receiver comprises a data bus inversion decoder configured to decode the plurality of data bits based on the data inversion bits.

12. The apparatus of claim 11, wherein the receiver comprises an error correcting code circuit configured to generate error correcting code bits based on the decoded plurality of data bits, the error correcting code circuit further configured to compare the received error correcting code bits with the generated error correcting code bits.

13. The apparatus of claim 12, wherein the error correcting code circuit is configured to correct a single bit error in the decoded plurality of data bits that is detected based on the comparison of the received error correcting code bits with the generated error correcting code bits.

14. The apparatus of claim 11, wherein the receiver is configured to provide the decoded plurality of data bits to an array.

15. The apparatus of claim 8 wherein the receiver is included in a memory device and the first plurality of interconnects comprises through silicon vias.

16. A method, comprising:
serially providing a plurality of data bursts to a data bus, the data bus comprising a plurality of signal lines, and at least one data burst of the plurality of data bursts utilizing less than all of the signal lines of the data bus; and
providing, in parallel with the at least one burst, additional information to the signal lines of the data bus not utilized by the at least one data burst.

17. The method of claim 16, further comprising generating error correcting code bits based on data provided in the plurality of data bursts, wherein the error correcting code bits are included in the additional information.

18. The method of claim 16, further comprising generating data bus inversion bits based on data provided in the plurality of data bursts, wherein the data bus inversion bits are included in the additional information.

19. The method of claim 18, further comprising encoding the data provided in the plurality of data bursts based on the data bus inversion bits.

20. The method of claim 19, wherein encoding the data provided in the plurality of data bursts comprises inverting a value of at least one bit of the data based on the data bus inversion bits.

21. The method of claim 16, wherein providing the plurality of data bursts to the data bus comprises serializing the data into a plurality of sets of data.

* * * * *

UNITED STATES PATENT AND TRADEMARK OFFICE
CERTIFICATE OF CORRECTION

| | | |
|---|---|---|
| PATENT NO. | : 8,826,101 B2 | Page 1 of 1 |
| APPLICATION NO. | : 14/028134 | |
| DATED | : September 2, 2014 | |
| INVENTOR(S) | : Ebrahim Hargan | |

It is certified that error appears in the above-identified patent and that said Letters Patent is hereby corrected as shown below:

On the title page, item (57), in "Abstract", in column 2, line 5, delete "("ECC)" and insert -- ("ECC") --, therefor.

Signed and Sealed this
Eighteenth Day of November, 2014

Michelle K. Lee
*Deputy Director of the United States Patent and Trademark Office*